Nov. 11, 1969  W. J. McNENNY  3,477,542
FRUIT PICKING DEVICE
Filed Feb. 15, 1967  3 Sheets-Sheet 2
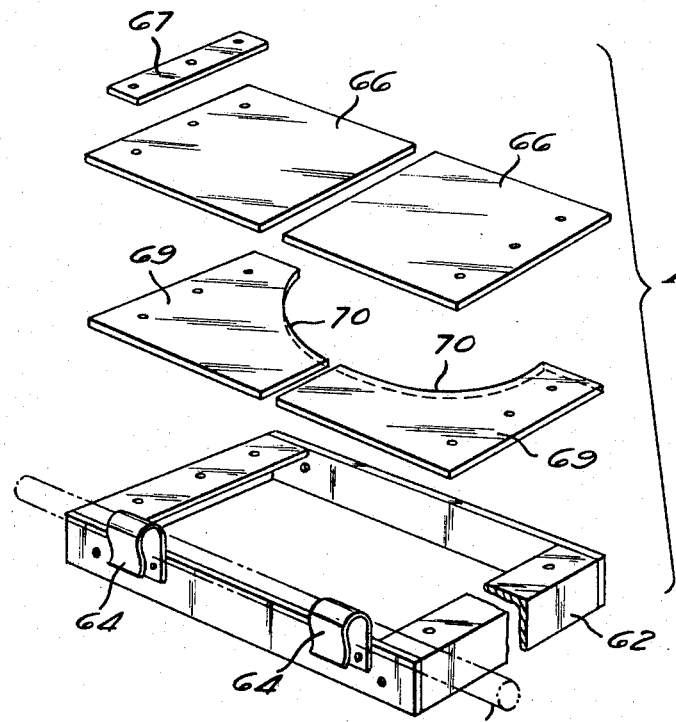
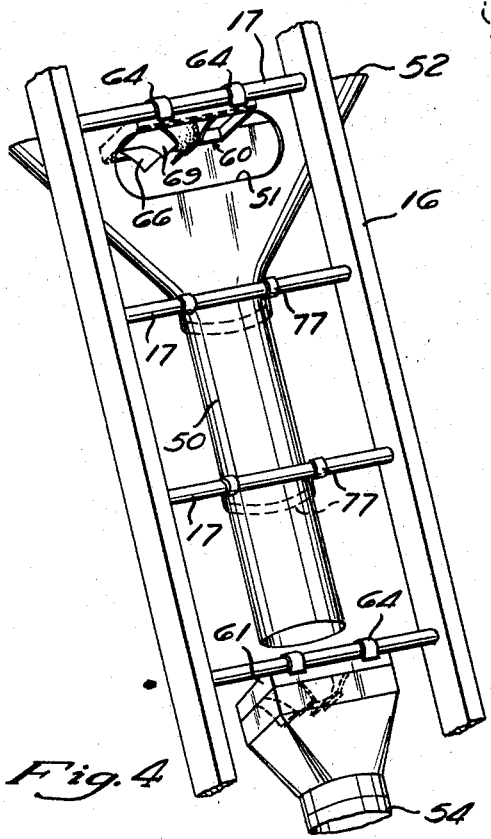
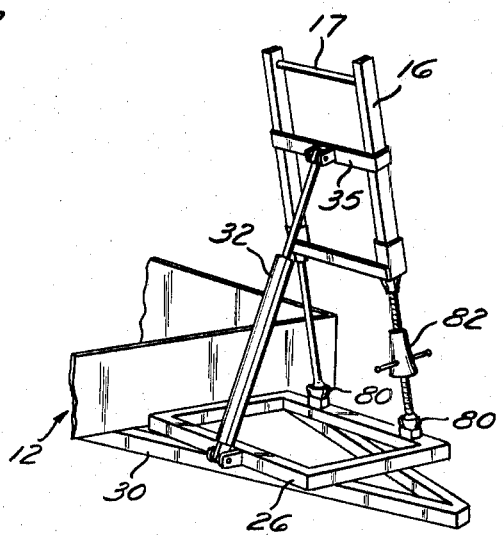
INVENTOR
WILBUR J. McNENNY
BY
McNENNY, FARRINGTON, PEARNE, & GORDON
ATTORNEYS Nov. 11, 1969  W. J. McNENNY  3,477,542
FRUIT PICKING DEVICE
Filed Feb. 15, 1967  3 Sheets-Sheet 3
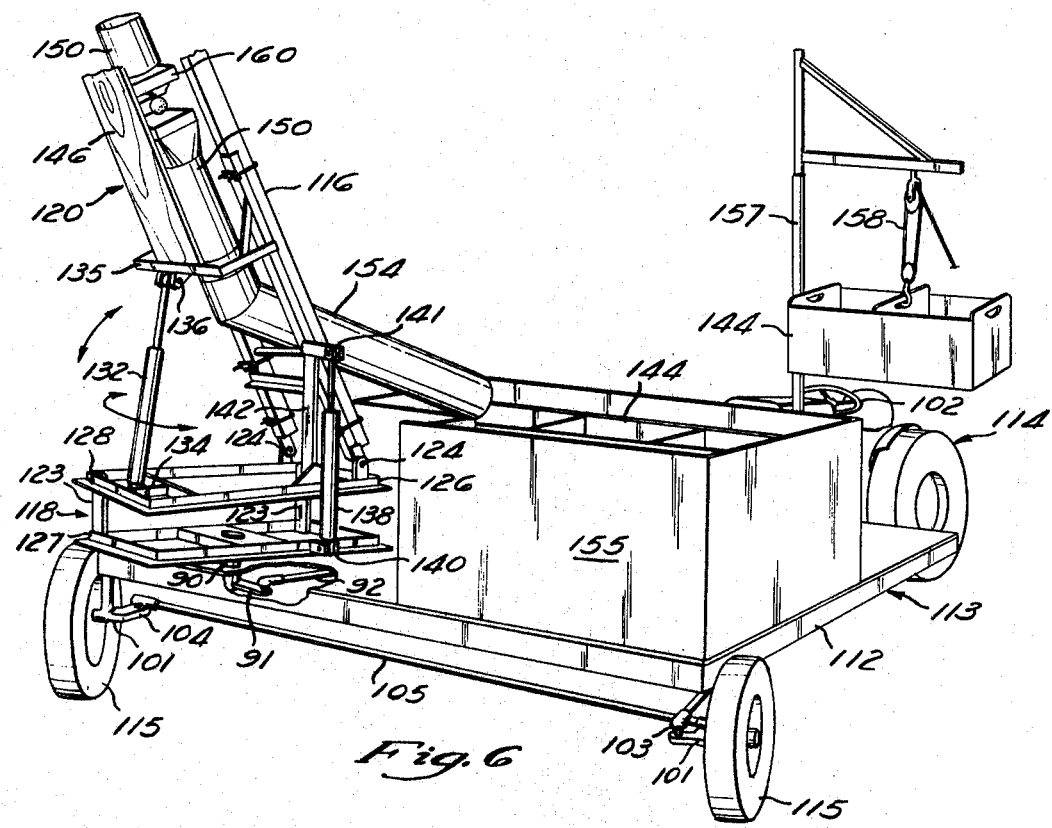
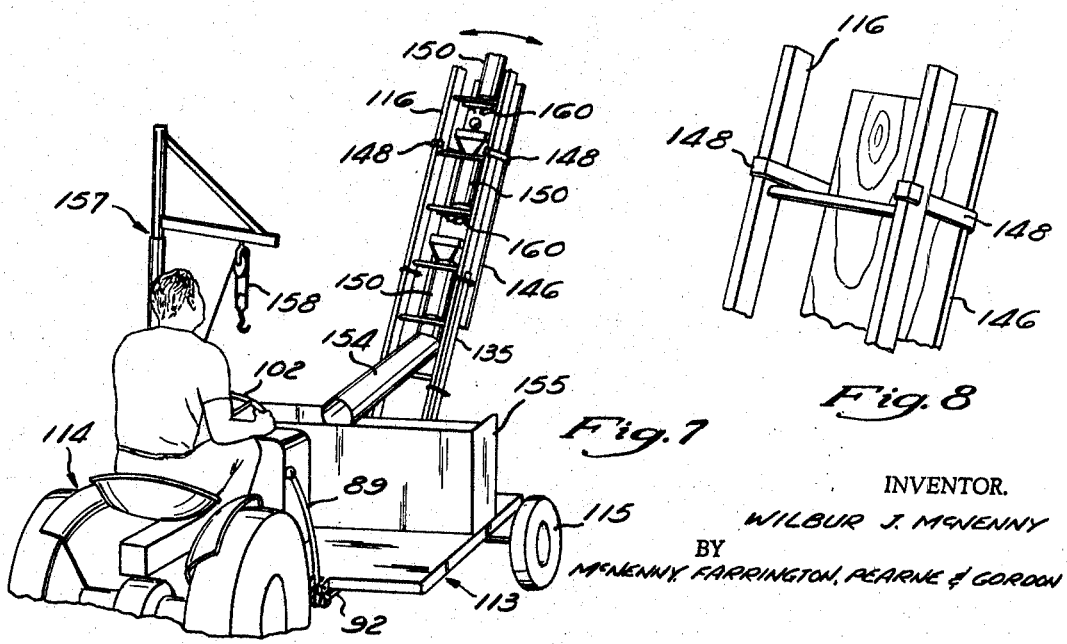
INVENTOR.
WILBUR J. McNENNY
BY
McNENNY, FARRINGTON, PEARNE & GORDON
ATTORNEYS

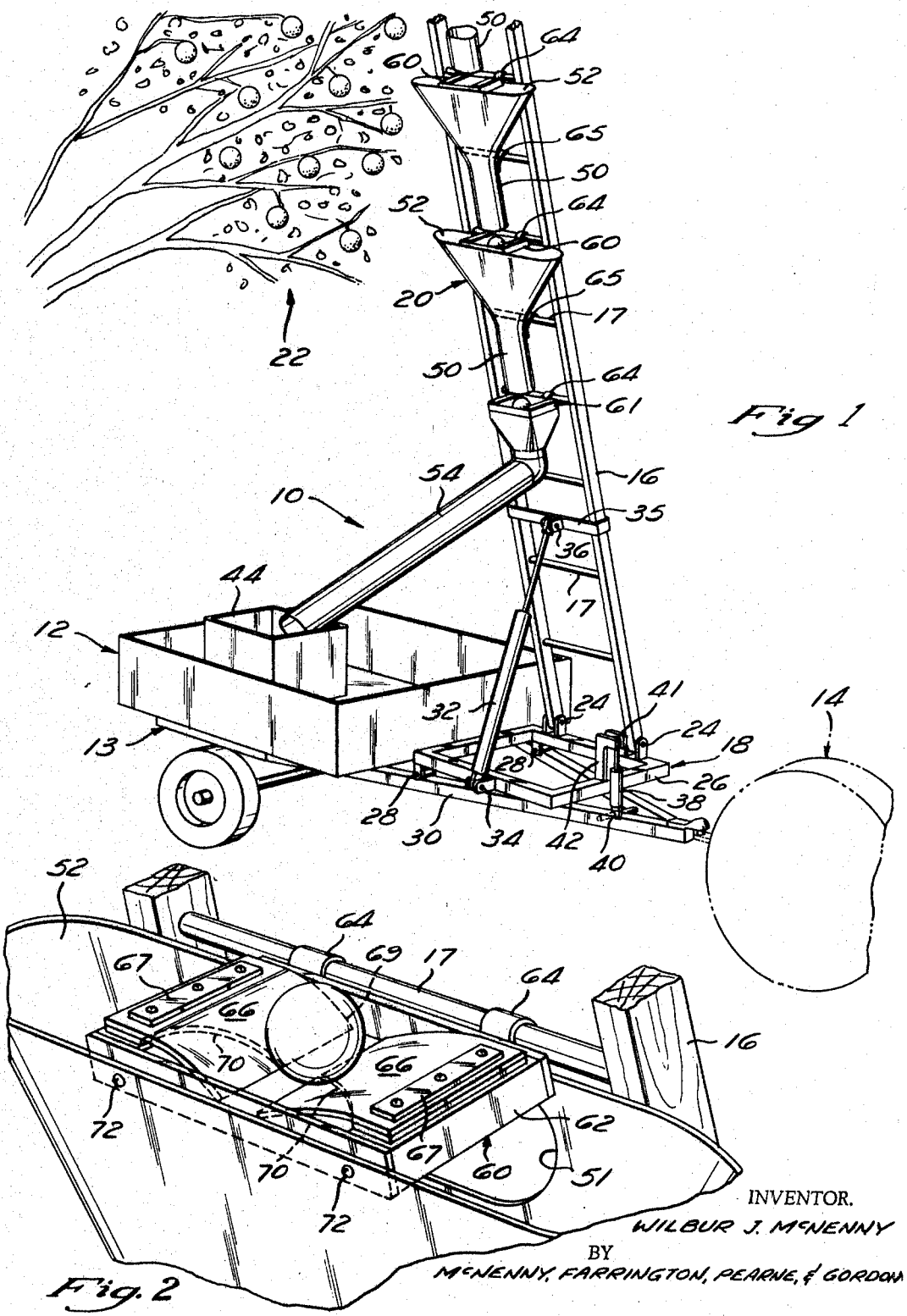

United States Patent Office 3,477,542
Patented Nov. 11, 1969

3,477,542
FRUIT PICKING DEVICE
Wilbur J. McNenny, P.O. Box 257,
Longwood, Fla. 32750
Filed Feb. 15, 1967, Ser. No. 616,309
Int. Cl. A01g 19/08; A62b 1/20
U.S. Cl. 182—49
8 Claims

ABSTRACT OF THE DISCLOSURE

Friut harvesting equipment including a ladder, positioining apparatus which swivels the ladder about a vertical axis as well as tilts it vertically and from side to side, fruit lowering apparatus including a communicating series of vertically spaced funnel-shaped sections along the ladder, each adapted to receive fruit and deliver it to the next lower section, and a series of stopper assemblies having flexible flaps for catching each piece of fruit and holding it until the next piece of fruit bumps the held piece through the flaps and is in turn held by the flaps.

BACKGROUND OF THE INVENTION

The present invention relates generally to harvesting apparatus and more particularly to citus fruit picking apparatus which enables the picker to gather fruit from all parts of the tree and transfer it without injury from each of a series of vertically spaced picking levels to a convenient collecting and storage means at the ground level.

The standard procedure for picking citrus fruit is for the picker to place a ladder against the fruit tree, ascend the ladder with a carrying bag capable of receiving about seventy-five pounds of fruit, pick the fruit starting from the top of the tree until the bag is filled, and descend the ladder to empty the bag. He then reascends the ladder as many times as necessary to pick the remaining fruit at lower levels in that location and then moves the ladder to a new location and repeats the process.

The quantity of fruit that may be collected on each trip up and down the ladder is limited by the weight a person can support and the strength of the ladder.

OBJECTS

The principal object of the present invention is to lower fruit by gravity, without injury to the fruit, from all points from the top to the bottom of the tree, so that the picker does not need to hold or support the fruit after it is picked, and all fruit within reach at one ladder location can be picked and safely lowered to the ground level during one trip down the ladder.

A further object is to reduce the cost of harvesting citrus fruit by reducing both the amount of physical effort and the time required to pick all of the fruit from each tree by means of simple inexpensive apparatus which does not require skilled workers or a disproportionate capital investment.

A further object is to provide an automatic adjustment of the fruit lowering means to handle fruit of different sizes and weights without injury.

Another object is to improve and simplify a power-operated vehicle mounting for a ladder, a fruit lowering device and a receiver in which the fruit can be collected in standard field boxes or bins for further transportation.

Additional objects and advantages of the present invenittion will become apparent from the accompanying drawings and the following detailed description of preferred embodiments of the invention.

BRIEF DESCRIPTION OF DRAWINGS

FIGURE 1 is a perspective view of a trailer mounted fruit picking apparatus made in accordance with the present invention;

FIGURE 2 is a partial perspective of the stopper and funnel conduit assembly embodied in the apparatus of FIGURE 1;

FIGURE 3 is an exploded view of the stopper assembly;

FIGURE 4 shows a modified arrangement for the stopper and conduit assemblies;

FIGURE 5 shows a modified embodiment of the ladder positioning apparatus; and

FIGURES 6, 7 and 8 show a further modified form of the ladder positioning and fruit lowering apparatus.

DESCRIPTION OF THE PREFERRED EMBODIMENTS

Referring to the drawings in greater detail, the simplest forms of the invention are shown in FIGS. 1–5, inclusive. FIG. 1 illustrates a fruit picking apparatus 10 mounted on a trailer 12, the bed 13 of which serves as a maneuverable platform. The trailer 12 is adapted to be maneuvered by any suitable means such as a tractor partially illustrated at 14. The fruit picking apparatus 10 includes a ladder 16 mounted on a positioning base 18 and a fruit lowering apparatus 20 running down the underside of the ladder 16.

The picking apparatus 10 is positioned relative to the fruit tree 22 by maneuvering the trailer 12 to a position on the ground wherein the ladder 16 is relatively close to the spot on the tree from which it is desired to pick the fruit. Once the ladder has been located generally relative to the tree 22, the operator then manipulates the positioning base 18 to tilt the ladder 16 into its final position against the tree 22. The positioning base 18 allows the operator to compensate either for the slope of the ground or for the particular location of the fruit by either raising or lowering the ladder or by tilting it from side to side.

The tilting of the ladder 16 is accomplished by hinging the lower end of the ladder at 24 to the frame portion 26 of the positioning apparatus 18 and by hinging the back edge of the frame 26 at 28 to the frame 30 of the trailer 12. The ladder 16 is pivoted about the hinges 24 by an extensible means in the form of an expansible chamber hydraulic cylinder 32 pivoted at 34 to the frame 26 and at 36 to a bracket 35 on the ladder 16. A second extensible means in the form of a second expansible chamber hydraulic cylinder 38 is used to pivot the frame 26 about the hinges 28. The cylinder 38 is pivoted at 40 to the trailer frame 30 and at 41 to a bracket 42 extending upwardly from the positioning frame 26. Thus, the positioning apparatus 18 allows the operator to raise and lower the ladder by actuating the cylinder 32 and to tilt the ladder from side to side by actuating the cylinder 38.

The fruit lowering apparatus 20 comprises a series of conduit sections 50 each formed with an upwardly facing funnel mouth 52 of a size to permit fruit to be dropped into the funnel mouth and to be guided downwardly through the conduit section. Each conduit section and its associated funnel mouth are preferably made of a substantially rigid plastic material, such as high density polyethylene or Fiberglas reinforced plastic. The series of conduit sections are supported in vertically extending alignment with the lower end of each conduit positioned to guide fruit into the funnel mouth of the next succeeding section. The funnel mouths 52 are sufficiently wider than the lower ends of the conduits so that with the lower end of one conduit section centered in the funnel mouth of the next lower section sufficient space is left on each side of the funnel mouth to permit fruit to be dropped in from either side.

The over-all length of each conduit section and its funnel mouth is preferably about two feet so that one of the funnel mouths is conveniently accessible to a picker at any level along the height of the lowering apparatus. Thus, with the lowering apparatus positioned vertically along the side of a tree a picker can start at the top and work down and drop all of the fruit within reach on each side of the lowering apparatus into one of the funnel mouths or through an opening 51 in the ladder side of the funnel mouth 52 without the necessity of carrying any of the fruit after it is picked.

The conduit sections 50 may be supported in alignment in any suitable way. As illustrated in FIGS. 1 and 2, they may be connected to the rungs 17 of the ladder 16 by hooks 64 and 65, with the lower end of each tubular section extending close to or into the center of the funnel mouth of the next lower section. Two conduit sections are illustrated in FIG. 1, but it will be understood that as many sections should be used as necessary to reach to the top of the particular tree from which fruit is being harvested. For use in picking oranges from mature orange trees, ten to fifteen conduit sections may be required to reach to the top of the tree.

For harvesting citrus fruit or other fruit which may be bruised or damaged by dropping with excessive speed, the fruit lowering assembly 20 is also provided with a series of stopper assemblies 60 arranged to catch and hold each piece of fruit after it falls a short distance, and to release and drop the held fruit when it is struck and bumped through the stopper by the next succeeding piece of fruit which in turn is caught and held in the stopper. The stoppers are spaced apart in the conduit assembly a short enough distance to avoid bruising or other injury to the fruit in dropping against the stopper or against another piece of fruit held in the stopper. In the case of citrus fruit, a spacing between stoppers of about two feet avoids injury to the fruit and, at the same time, allows each falling piece of fruit to acquire sufficient momentum to bump the previous piece of fruit through the stopper in which it is held. Since this spacing is of the same order as the desired spacing between the funnel mouths to permit convenient picking and dropping of the fruit at every level, one stopper is preferably mounted between the lower end of each conduit section and the entrance of the next lower section. In the arrangement illustrated in FIGS. 1 and 2, one stopper is centrally secured in the funnel mouth of each conduit section except the uppermost section. A final stopper assembly 61 may also be mounted below the discharge end of the lowermost conduit section in the entrance of an inclined run-out tube 54 positioned to direct the fruit into a field box 44 or other suitable collecting zone. The run-out tube 54 may be six to ten feet long without additional stoppers when it is arranged at an angle of no more than about 45° to the horizontal without danger of bruising or otherwise injuring the fruit.

As shown in FIGS. 2 and 3, each stopper assembly 60 includes a frame 62 adapted to be centrally secured in the entrance of a funnel mouth 52. A pair of rubber flaps 66 have their outer ends secured by strips 67 to the opposite ends of the frame 62 and extend toward each other across the space within the frame 62 with their sides and inner ends free so that they can be bent downwardly by a falling orange or other fruit as shown in FIG. 2. Each of the flaps 66 in the illustrated embodiment is reinforced by a second rubber flap 69 which is similarly secured to the frame 62 at its outer end and extends under and in contact with its associated flap 66. Each of the flaps 69 is partially cut away as indicated at 70 so that its resistance to bending increases in the direction from its free end to its fixed outer end. The cut away parts 70 of the flaps 69 are positioned on the side away from the ladder 16 so that no reinforcement is provided for the flap 66 in the area above the cut-out 70 adjacent the side of the frame 62 farthest away from the ladder.

In normal use the ladder is inclined against the side of the tree so that gravity tends to hold the falling fruit against the side of the conduit sections away from the ladder. Thus, the smaller sizes of falling fruit strike the flaps 66 at their weakest portions and larger sizes of fruit encounter progressively increased stiffness from the flaps both in the direction away from the gravity side of the conduit sections and in the direction toward the fixed outer ends of the flaps. This arrangement automatically compensates for the increased weight and momentum of the larger size fruit while allowing maximum flexibility for the smallest sizes. It will be understood of course that this variation in stiffness and flexibility of the flaps can be secured in any other desired manner, as by molding the flaps 66 with varying thickness.

For harvesting oranges it has been found that the flaps 66 and 69 may be cut from ⅛-inch thick sheets of natural or synthetic vulcanized rubber such as that sold commercially as gasket rubber. Using this material, when each flap 66 is made about four inches square and the cut-outs 70 in the flaps 69 extend from about the center of the inner free edges to the side edges near the fixed outer ends, the desired relation of stiffness and flexibility is obtained for satisfactory operation with oranges of substantialy all sizes. With this relation of stiffness and flexibility and with a drop of about two feet from each funnel mouth to the next stopper assembly each falling orange which strikes the stopper assembly loses its momentum after it has bent down the flaps 66 and 69 and protruded through them far enough to be gripped and held between the flaps. The next orange bumps and drives the held orange through the flaps and is in turn gripped and held, the previously held orange again dropping about two feet to the next stopper. Thus, the stopper assemblies function to limit the amount of momentum each piece of fruit builds up as it falls from one conduit assembly to the other. After passing through the final stopper assembly 61, which is identical to the stoppers 60, the fruit rolls down the run-out tube 54 to the box 44.

As shown in FIG. 2, each stopper assembly is secured in the funnel-shaped mouth 52 of one of the conduits 50 in any convenient way as by bolts 72 extending into the frame 62. The hooks 64 for engaging the ladder rungs 17 may also be bolted or otherwise secured to the frames 62, while the hooks 65 are secured directly to the conduits 50 by adhesive or other connector. As shown in FIG. 4, the hooks 65 may be replaced by straps 77 fastened to ladder rungs.

FIG. 5 illustrates a modification of the apparatus for tilting the ladder 16 from side to side. The modification includes bi-directional pivots 80 such as ball socket joints located at the lower end of each ladder leg and a screw jack 82 in one leg. With this arrangement the operator can tilt the ladder sideways to the proper position relative to the tree merely by turning the screw jack.

FIGS. 6 and 7 illustrate the preferred form of the invention. In this embodiment the front wheels of the tractor 114 are removed and the tractor frame rests upon and is secured to a forwardly extending covered frame 112 serving as the maneuverable platform 113 upon which the ladder 116 is mounted. The frame 112 is rigidly secured to the frame of the tractor 114 while the front of the tractor and the frame are supported by wheels 115 secured to axle brackets 101 on each front corner of the frame 112. These are preferably the axle brackets and front wheels removed from the tractor. The steering wheel 102 of the tractor is connected to the pivoting axle brackets 101 for the wheels 115 through an elongated drag link 103, a steering arm 104, and tie rod 105. With this arrangement it is a simple matter to position the maneuverable platform 113 relative to the fruit tree since the platform forms the steerable front end portion of the tractor 114.

In this embodiment the positioning base 118 for the ladder 116 is pivotally mounted to the platform frame 112 by a swivel 90. The operator can rotate the swivel 90 through an arc of approximately 120° by manipulating a pivoted hand lever 89 on the tractor 114. A link 92 connects the hand lever 89 to a laterally extending arm 91 on the swivel 90.

The positioning base 118 includes a lower frame 127 mounted on the swivel 90 and an upper frame 126. One side of the upper frame 126 is hinged at 128 to the upper ends of a pair of brackets 123 which space the upper and lower frames apart. The opposite side of the upper frame 126 is connected to the lower frame 127 by an expansible chamber hydraulic cylinder 138. The cylinder 138 is pivoted at 140 to the lower frame 127 and at 141 to a bracket 142 extending upwardly from the upper frame 126. Actuation of the cylinder 138 tilts the ladder 116 from side to side by pivoting the upper frame 126 about the hinges 128 to move the upper frame 126 either above or below a neutral or horizontal position.

As in the previous embodiments, the legs of the ladder 116 are pivoted about hinges 124 on the upper frame 126 by a hydraulic cylinder 132 which is pivoted to the frame 126 at 134 and to a ladder bracket 135 at 136. With the lower frame 127 mounted on the swivel 90, the ladder 116 and fruit lowering apparatus 120 can be quickly positioned by the operator while the platform 113 is being driven up to the tree.

In this embodiment the fruit lowering apparatus 120 comprises a long board 146 upon which a plurality of funnel-shaped conduit sections 150 and stopper assemblies 160 are mounted. To provide a clear view of the fruit behind the ladder 116, the board 146 can be made of a transparent plastic material. The board 146 is secured to the ladder along its length by brackets 148 while its lower end is secured to the ladder bracket 135 which is also secured to the ladder. By mounting the conduit sections 150 and stopper assemblies 160 on the board 146, the entire lowering apparatus can be easily removed from the ladder and stored as an assembled unit. Thus, there is no need to realign the conduit sections and stopper assemblies when the apparatus is reinstalled on the ladder.

The platform 113 includes an enclosure 155 in which as many as five field boxes 144 can be placed. The height of the enclosure 155 is greater than that of the field boxes so that the fruit coming out of the run-out tube 154 can fill a box and overflow into the next box without spilling out onto the ground. Near the rear of the platform 113 is a pivoted boom 157 with a block and tackle arrangement 158 for removing the loaded field boxes 144 from the enclosure 155.

While several embodiments of this invention have been shown and described in considerable detail, it is recognized that the invention is not limited to the form shown and described and that various modifications and rearrangements may be made without departing from the scope of the invention as defined in the following claims.

What is claimed is:

1. Fruit harvesting apparatus comprising conduit means adapted to be supported in a generally vertical position alongside a tree to define a path of travel for harvested fruit, a plurality of stopper means spaced along said conduit means, each of said stopper means comprising a plurality of substantially coplanar resilient flaps extending toward each other to substantially close said path to gate said conduit means and adapted to be flexed downwardly to permit fruit to pass, the said flaps being sufficiently stiff to catch and hold a piece of falling fruit until it is struck and forced through by a succeeding piece of falling fruit which is in turn caught and held, whereby the fruit is lowered through the conduit means in successive drops from one stopper means to the next.

2. Fruit harvesting apparatus comprising a stopper device adapted to be interposed in a generally vertically extending conduit means to limit the momentum of fruit descending along a path through said conduit means, said stopper device comprising a plurality of substantially coplanar flexible flaps extending toward each other and adapted to extend into and gate said conduit means to substantially close the path of travel of fruit descending through said conduit means, said flaps being sufficiently stiff to catch and hold a descending piece of fruit until it is struck and forced through by a succeeding piece of fruit which is in turn caught and held.

3. Harvesting apparatus comprising maneuverable platform means, vertical swivel means mounted on said platform means, first base means mounted on said swivel means for swiveling about a vertical axis, second base means pivotally connected to said first base means by a first pivot means, first extensible means extending between said first base means and said second base means for pivoting said second base means about said first pivot means, ladder means, second pivot means connecting the lower end of said ladder to said second base means, second extensible means extending between said second base means and said ladder for pivoting said ladder about said second pivot means.

4. Fruit harvesting apparatus comprising conduit means adapted to be supported in a generally vertical position alongside a tree, a plurality of stopper means spaced along said conduit means, each of said stopper means including resilient flap means extending into and gating said conduit means and adapted to be flexed downwardly to permit fruit to pass, the said flap means being sufficiently stiff to catch and hold a piece of falling fruit until it is struck and forced through by a succeeding piece of falling fruit which is in turn caught and held, said flap means being formed to provide increasing stiffness with increases in the diameter of fruit dropped through said conduit means, whereby the fruit is lowered through the conduit means in successive drops from one stopper means to the next.

5. Fruit harvesting apparatus comprising conduit means adapted to be supported in a generally vertical position alongside a tree, a plurality of stopper means spaced along said conduit means, each of said stopper means including resilient flap means extending into and gating said conduit means and adapted to be flexed downwardly to permit fruit to pass, the said flap means being sufficiently stiff to catch and hold a piece of falling fruit until it is struck and forced through by a succeeding piece of falling fruit which is in turn caught and held, said conduit means including intermediate conduit sections each having an upwardly opening funnel mouth with one of said stopper means mounted therein, and a tubular portion leading into the funnel mouth of the next lower section, said funnel mouths extending laterally beyond the stopper means mounted therein whereby fruit may be dropped into each of said funnel mouths and whereby the fruit is lowered through the conduit means in successive drops from one stopper means to the next.

6. Harvesting apparatus comprising support means, a positioning base mounted on said support means, a ladder pivotally mounted on said positioning means for tilting movement vertically transversely of the plane of said ladder, first extensible means between said ladder and said positioning base for tilting said ladder vertically transversely of the plane of said ladder, second extensible means between said support means and said positioning base for tilting said ladder from side to side within the plane of said ladder.

7. Harvesting apparatus as set forth in claim 6 wherein said support means is a wheeled vehicle.

8. Harvesting apparatus as set forth in claim 6 having a series of vertically spaced upwardly opening conduit means mounted along said ladder and adjacent the lower end of each conduit means, each of said stopper means including resilient flap means extending transversely of the axis of said conduit means and adapted to catch and hold a piece of fruit falling through said conduit means until it is struck and forced through by a succeeding falling piece of fruit.

(References on following page)

References Cited

UNITED STATES PATENTS

| | | | |
|---|---|---|---|
| 289,942 | 12/1883 | Titus | 182—49 |
| 638,832 | 12/1899 | Carlton | 182—49 |
| 967,365 | 8/1910 | Gordon | 182—49 |
| 1,339,338 | 5/1920 | Hickok | 182—49 |
| 1,637,197 | 7/1927 | Mattes | 182—19 |
| 2,951,549 | 9/1960 | Holan | 182—66 |

REINALDO P. MACHADO, Primary Examiner